April 10, 1951     D. J. DE MICHELE     2,548,592
RESISTANCE STRAIN GAUGE AND METHOD FOR MAKING SAME
Filed Aug. 26, 1949
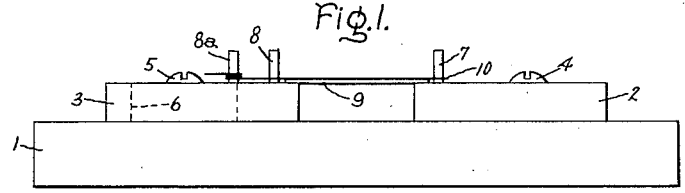
Fig. 1.
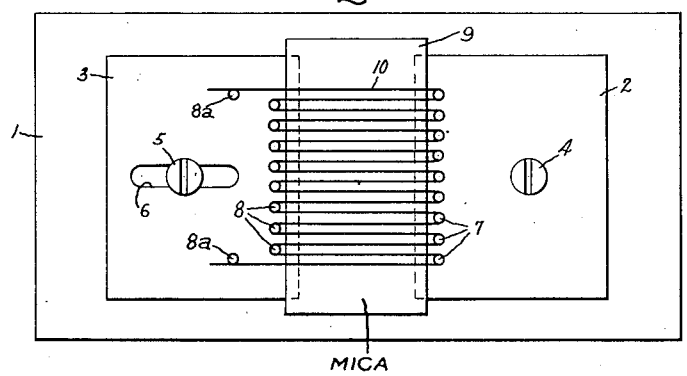
Fig. 2.
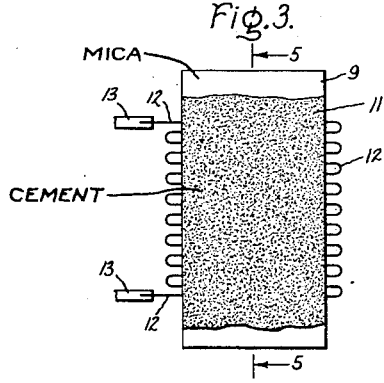
Fig. 3.
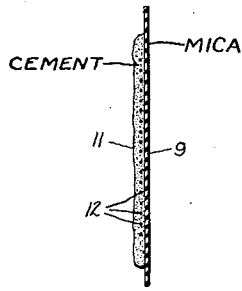
Fig. 5.
Fig. 4.
Fig. 6.
Inventor:
Dominick J. DeMichele,
by Paul A. Frank
His Attorney.

Patented Apr. 10, 1951

2,548,592

UNITED STATES PATENT OFFICE 2,548,592

RESISTANCE STRAIN GAUGE AND METHOD FOR MAKING SAME

Dominick J. De Michele, Schenectady, N. Y., assignor to General Electric Company, a corporation of New York Application August 26, 1949, Serial No. 112,614

1 Claim. (Cl. 201—63)

This invention relates to resistance type electric strain gauges, in particular to improved gauges for use at high temperatures, and to a method for making the same.

Resistance type electric strain gauges are commercially available which comprise an electrically conductive filament permanently bonded to a supporting member, which is commonly a sheet of paper. In use, these gauges are cemented to the structure subject to strain, so that strain of such structure produces an elongation or a compression of the filament, which changes its electrical resistance. Since the supporting piece of paper remains a part of the gauge, these gauges are not suitable for use at temperatures which are even moderately high. Gauges have been made without the supporting paper by winding and cementing the filament directly upon the structure subject to strain, but the manufacture of such gauges is difficult and each gauge must be custom made at the time it is to be used.

An object of this invention is to provide improved resistance type electric strain gauges especially adapted for high temperature work, which may be conveniently distributed as small prefabricated units, and from which the supporting member can be removed before the gauge is placed in use.

Other objects and advantages of the invention will appear as the description proceeds.

The features of this invention which are believed to be novel and patentable are pointed out in the claim which forms a part of this specification. For a better understanding of the invention, reference is made in the following description to the accompanying drawing, in which Fig. 1 is an elevation and Fig. 2 is a plan view showing a step in the manufacture of improved strain gauges; Fig. 3 is a plan view and Fig. 4 is an elevation of an improved strain gauge before removal of the supporting member; Fig. 5 is a section along line 5—5, Fig. 3; and Fig. 6 is an elevation of the improved strain gauge after removal of the supporting member.

Referring now to Figs. 1 and 2, the gauge is preferably made upon a jig comprising a base plate 1 on which two smaller plates 2 and 3 are attached by screws 4 and 5. As shown, plate 2 may be held in fixed position on base 1, but plate 3 is preferably provided with a slot 6 into which screw 5 fits, so that plate 3 is movable, when screw 5 is loosened, to permit adjustment of the distance between plates 2 and 3.

Along the side of plate 2 nearest plate 3 is a row of small vertical pins 7. These pins may be about 13 mils in diameter and spaced apart a distance of 26 mils from center to center of adjacent pins. The side of plate 3 nearest plate 2 is provided with a similar row of pins 8. The two end pins 8a may be set back a bit from the row of other pins, as shown, to facilitate the winding operation hereinafter described.

With screw 5 loosened, plate 3 is adjusted until the distance between the two rows of pins 7 and 8 corresponds to the length of gauge required. Screw 5 is then tightened. A plate of mica 9, preferably about 5 mils thick, is placed on the jig between the two rows of pins. The mica should be approximately 30 mils shorter in width than the gauge length selected. An electrically conductive filament 10 is then wound in the following manner: One end of the filament is wound for several turns about one of the pins 8a, to hold this end of the filament in place. Then the filament is wound about successive pins of the two rows alternately, as shown, until the other pin 8a is reached. The filament is wound several turns about this pin to hold it in place. The filament may now be pushed down against the mica plate, screw 5 loosened, and plate 3 pulled back a very small amount to pull the filament taut. Screw 5 is then tightened. The filament may be a fine metal wire, preferably about 0.0008 inch in diameter and made from an alloy of 85% platinum and 15% iridium.

Next, an electrically nonconductive bonding cement is brushed onto the face of plate 9, until a coating about 2 mils thick is obtained which covers those portions of filament 10 which extend across the face of the plate. Care should be taken that no cement is applied to pins 7 and 8. The cement thus forms a block of bonding material in which the filament is embedded. For making a strain gauge suitable for use at high temperatures, the bonding material may be No. 31 Sauereisen cement, manufactured by the Sauereisen Cement Company of Pittsburgh, Pennsylvania, mixed to a proportion 1 part filler to 3 parts binder by volume.

The jig, with the gauge wound thereon, is placed in an oven and the cement is dried at 100° F. for 5 to 10 minutes. The cement is then sufficiently dry to be handled and is adherent but not permanently bonded to the mica. The gauge is then removed from the jig by loosening screw 5 and moving plate 3 slightly toward the mica. The assembled mica plate, filament, and cement may then be lifted from the jig and kept until it is desired to use the gauge. Preferably, electrically conductive leads are spot welded to each end of filament 10 to facilitate connection of the gauge into electric circuits when the gauge is used. The leads may, for example, be platinum-iridium flat wire having a cross section 0.013 inch by 0.015 inch, or may be platinum ribbon foil 0.005 inch thick cut to any width desired. When the filament is wound on the jig, instead of winding the ends around pins 8a as described, the filament ends may be spot welded to the leads before winding and the leads held in position with adhesive cellulose tape.

The completed gauge is shown in Figs. 3 through 5. Referring to these figures, the supporting plate of mica is illustrated at 9, the block of bonding cement at 11, the electrically conductive filament at 12, and the leads at 13.

When the gauge is to be used upon a structure subject to strain, the part of the structure to which the gauge is to be attached should be sand blasted with fine silica and then thoroughly cleaned with denatured alcohol. A coating of 6LAC preparation (obtainable from the United States Bureau of Standards) may be brushed on the area cleaned. This coating should not be more than 2 mils thick. The coated structure is then fired at 1700° F. for one minute. After cooling, the coating will have a hard, green, glazy finish. Too thick a coating will cause flaking, and incorrect temperatures when firing will give a powdery finish. If correctly prepared, the coating cannot be scratched with a sharp knife. The 6LAC preparation may be omitted if the gauge is to be used for only a short testing time at temperatures not exceeding about 1000° F.

When ready to mount the gauge, the cement block is separated from the mica by bending the mica slightly. This is easily done since the cement does not form a permanent bond with the mica. The gauge, with mica removed, is illustrated in Fig. 6.

The gauge may now be placed on the coated structure in the position desired, and a strip of adhesive cellulose tape placed on the leads to hold it in position. The gauge is lifted and No. 31 Sauereisen cement, mixed in proportions of 1 part filler to 2 parts binder, is smeared on the structure beneath the gauge. The gauge is placed back in position on the wet cement and pressed firmly against the structure until the cement is slightly air dried. Pressure may be best applied by placing a sheet of cellophane on top of the gauge and a piece of sponge rubber on the cellophane and pressing upon the rubber. The structure with the gauge attached is then baked for 30 minutes at 120° F. After baking, Sauereisen cement is applied to the gauge and leads as a final protective coating and is then cured at 1000° F. for one hour. The temperature of the oven should be taken to curing temperature slowly or blistering may occur.

After curing, the gauge will have a hard, white finish which can be tested by attempting to scrape the cement with a sharp knife. The gauge may now be used for dynamic strain measurements at the higher temperatures. Such gauges withstand temperatures of 1500° F. for approximately eight hours or more.

Having described the principles of this invention and the best mode in which I have contemplated applying those principles, I wish it to be understood that the examples given are illustrative only and that other means can be employed without departing from the true scope of the invention.

What I claim as new and desire to secure by Letters Patent of the United States is:

The method of making resistance type electric strain gauges which comprises placing a mica plate between two rows of pins on a winding jig, winding an electrically conductive filament around successive pins on opposite sides of the mica plate alternately so that the filament extends back and forth across the face of the mica plate, applying bonding cement upon the face of the mica plate to form a block of bonding material within which such filament is embedded, drying the cement sufficiently to permit handling thereof, the cement adhering to the mica without becoming permanently bonded thereto, and removing the assembled plate, filament, and cement from the jig.

DOMINICK J. DE MICHELE.

REFERENCES CITED

The following references are of record in the file of this patent:

UNITED STATES PATENTS

| Number | Name | Date |
| --- | --- | --- |
| 2,350,073 | Simmons | May 30, 1944 |
| 2,401,049 | Campbell et al. | May 28, 1946 |

OTHER REFERENCES

De Forest I, Instruments, April 1942, pages 112–114.

De Forest II, Technical Notes #744, Nat. Advisory Comm. for Aeronautics, January 1940. 38 pages of description and 13 pages of diagrams.